US010252413B2

(12) United States Patent
Makino et al.

(10) Patent No.: US 10,252,413 B2
(45) Date of Patent: Apr. 9, 2019

(54) ROBOT AND ROBOT SYSTEM

(71) Applicant: Seiko Epson Corporation, Tokyo (JP)

(72) Inventors: Toru Makino, Tsuruoka (JP); Nao Kobayashi, Tsusuoka (JP); Akihiro Gomi, Fujimi (JP); Takuya Owa, Matsumoto (JP)

(73) Assignee: Seiko Epson Corporation (JP)

( * ) Notice: Subject to any disclaimer, the term of this patent is extended or adjusted under 35 U.S.C. 154(b) by 193 days.

(21) Appl. No.: 15/358,265

(22) Filed: Nov. 22, 2016

(65) Prior Publication Data

US 2017/0151664 A1 Jun. 1, 2017

(30) Foreign Application Priority Data

Nov. 30, 2015 (JP) ................................. 2015-233338

(51) Int. Cl.
*B25J 9/00* (2006.01)
*B25J 5/00* (2006.01)
*B25J 5/02* (2006.01)
*B25J 9/16* (2006.01)

(52) U.S. Cl.
CPC ............... *B25J 9/0027* (2013.01); *B25J 5/00* (2013.01); *B25J 5/02* (2013.01); *B25J 9/1638* (2013.01); *G05B 2219/40252* (2013.01); *G05B 2219/41117* (2013.01); *Y10S 901/09* (2013.01); *Y10S 901/27* (2013.01)

(58) Field of Classification Search
CPC ...... B25J 9/0027; B25J 9/1638; B25J 9/1653; B25J 9/1669; B25J 5/00–5/06; Y10S 901/09; G05B 2219/40252; G05B 2219/41117
See application file for complete search history.

(56) References Cited

U.S. PATENT DOCUMENTS

2015/0053636 A1* 2/2015 Pa mann .................. B66C 6/00
212/71

FOREIGN PATENT DOCUMENTS

JP 06-079472 A 3/1994

OTHER PUBLICATIONS

Seraji, Homayoun, "Motion Control of Mobile Manipulators", Jul. 1993, IEEE/RSJ International Conference on Intelligent Robots and Systems, pp. 2056-2063 (Year: 1993).*
Tsetserukou et al., "Vibration Damping Control of Robot Arm Intended for Service Application in Human Environment", Dec. 2008, IEEE-RAS International Conference on Humanoid Robots, pp. 441-446 (Year: 2008).*

* cited by examiner

Primary Examiner — Spencer D Patton
(74) Attorney, Agent, or Firm — Harness, Dickey & Pierce, P.L.C.

(57) ABSTRACT

A robot of the invention can be moved by a carrying apparatus, and in which a period between a settling start time and a settling end time of the robot overlaps with at least a part of a period between a settling start time and a settling end time of the carrying apparatus. Further, the settling start time of one having a shorter settling time of the robot and the carrying apparatus is later than the settling start time of the other having a longer settling time of the robot and the carrying apparatus or the same as the settling start time of the other having the longer settling time.

10 Claims, 7 Drawing Sheets

ROBOT AND ROBOT SYSTEM

BACKGROUND

1. Technical Field

The present invention relates to a robot and a robot system.

2. Related Art

In related art, robots having a base and a plurality of arms (links) are known. One arm of the adjacent two arms is rotatably coupled to the other arm via a joint part, and the arm on the most proximal end side (on the most upstream side) is rotatably coupled to the base via a joint part. Further, as an end effector, e.g. a hand is detachably attached to the arm on the most distal end side (on the most downstream side). For example, the robot grasps an object with the hand, moves the object to a predetermined location, and performs a predetermined work such as assembly.

Patent Document 1 (JP-A-6-79472) discloses a robot provided on traveling rails and the robot moves along an axis direction of the traveling rails by the traveling rails.

However, in the robot disclosed in Patent Document 1, in the movement of the robot on the traveling rails and actions of arms of the robot, nothing is considered about the respective stop times and there is a problem that the entire settling time of the robot and the traveling rails is longer depending on the stop times.

SUMMARY

An advantage of some aspects of the invention is to solve at least a part of the problems described above, and the invention can be implemented as the following forms or application examples.

A robot according to an aspect of the invention is a robot that can be moved by a carrying apparatus, wherein a period between a settling start time and a settling end time of the robot overlaps with at least a part of a period between a settling start time and a settling end time of the carrying apparatus.

With this configuration, in comparison to the case where settling of one of the robot and the carrying apparatus ends, and then, settling of the other is started, the entire settling time of the robot and the carrying apparatus may be shortened.

In the robot according to the aspect of the invention, it is preferable that the settling start time of one having a shorter settling time of the robot and the carrying apparatus is later than the settling start time of the other having a longer settling time of the robot and the carrying apparatus or the same as the settling start time of the other having the longer settling time.

With this configuration, the entire settling time of the robot and the carrying apparatus may be shortened.

In the robot according to the aspect of the invention, it is preferable that the settling end time of one having a shorter settling time is earlier than the settling end time of the other having a longer settling time or the same as the settling end time of the other having the longer settling time.

With this configuration, the entire settling time of the robot and the carrying apparatus may be properly shortened.

In the robot according to the aspect of the invention, it is preferable that an inertial sensor is provided in the robot, and damping control of the robot is performed based on a detection result of the inertial sensor.

With this configuration, vibrations of the robot may be suppressed.

Further, the vibrations of the robot are suppressed and the settling time of the robot may be shortened. Furthermore, the vibrations of the carrying apparatus may be suppressed by the damping control, and the settling time of the carrying apparatus may be shortened. Thereby, the entire settling time of the robot and the carrying apparatus may be shortened.

In the robot according to the aspect of the invention, it is preferable that the inertial sensor is an angular velocity sensor.

With this configuration, the vibrations of the robot may be suppressed based on the detection result of the angular velocity sensor.

In the robot according to the aspect of the invention, it is preferable that the damping control is ended after settling of one having the later settling end time of the robot and the carrying apparatus ends.

With this configuration, the respective settling times of the robot and the carrying apparatus may be shortened, and thereby, the entire settling time of the robot and the carrying apparatus may be shortened.

In the robot according to the aspect of the invention, it is preferable that the damping control is ended when vibrations of the robot and vibrations of the carrying apparatus respectively fall within predetermined ranges.

With this configuration, the vibrations of the robot may be suppressed more properly.

In the robot according to the aspect of the invention, it is preferable that a first arm rotatable about a first rotation axis and a second arm provided on the first arm to be rotatable about a second rotation axis in a axis direction different from a axis direction of the first rotation axis are provided.

With this configuration, a wide variety of works may be performed.

In the robot according to the aspect of the invention, it is preferable that a settling time of the robot is shorter than a settling time of the carrying apparatus.

With this configuration, in an action of moving a distal end of a robot arm of the robot to a target position, the time from when the action is started to when the settling ends may be shortened.

A robot system according to an aspect of the invention includes the robot according to the aspect of the invention and the carrying apparatus that can move the robot.

With this configuration, in comparison to the case where settling of one of the robot and the carrying apparatus ends, and then, settling of the other is started, the entire settling time of the robot and the carrying apparatus may be shortened.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a robot and a robot system according to the invention will be explained in detail based on embodiments shown in the accompanying drawings.

Figure 1:
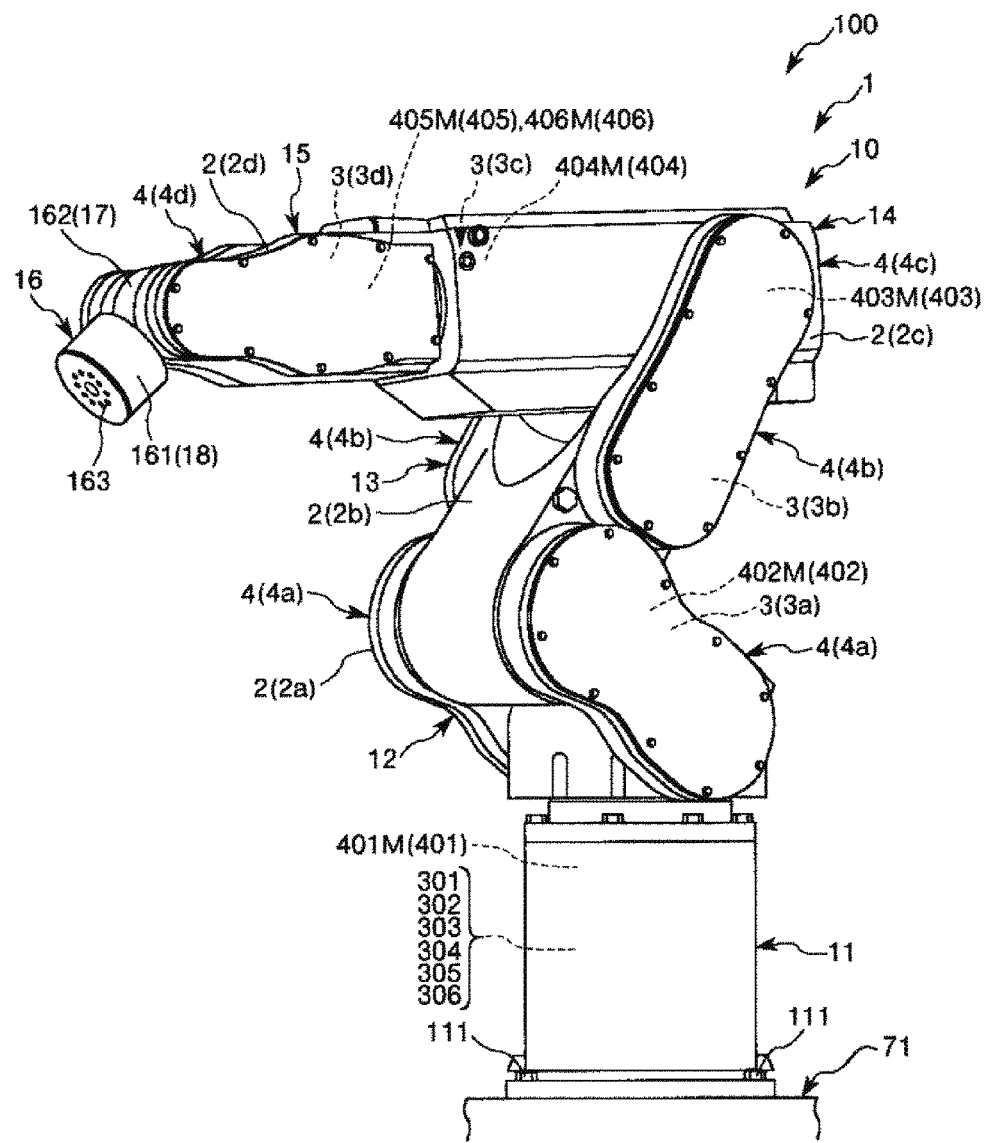
FIG. 1 is a perspective view of a robot as seen from a front side in an embodiment of a robot system according to the invention.
Figure 2:
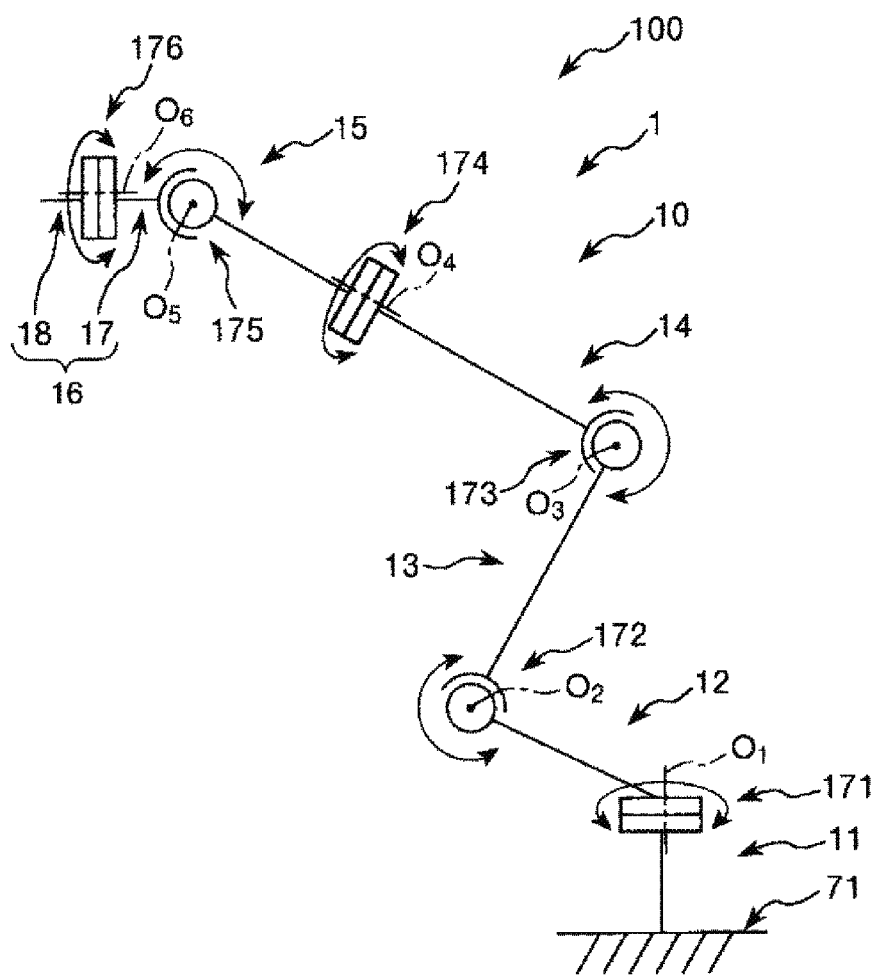
FIG. 2 is a schematic diagram of the robot shown in FIG. 1.
Figure 3:
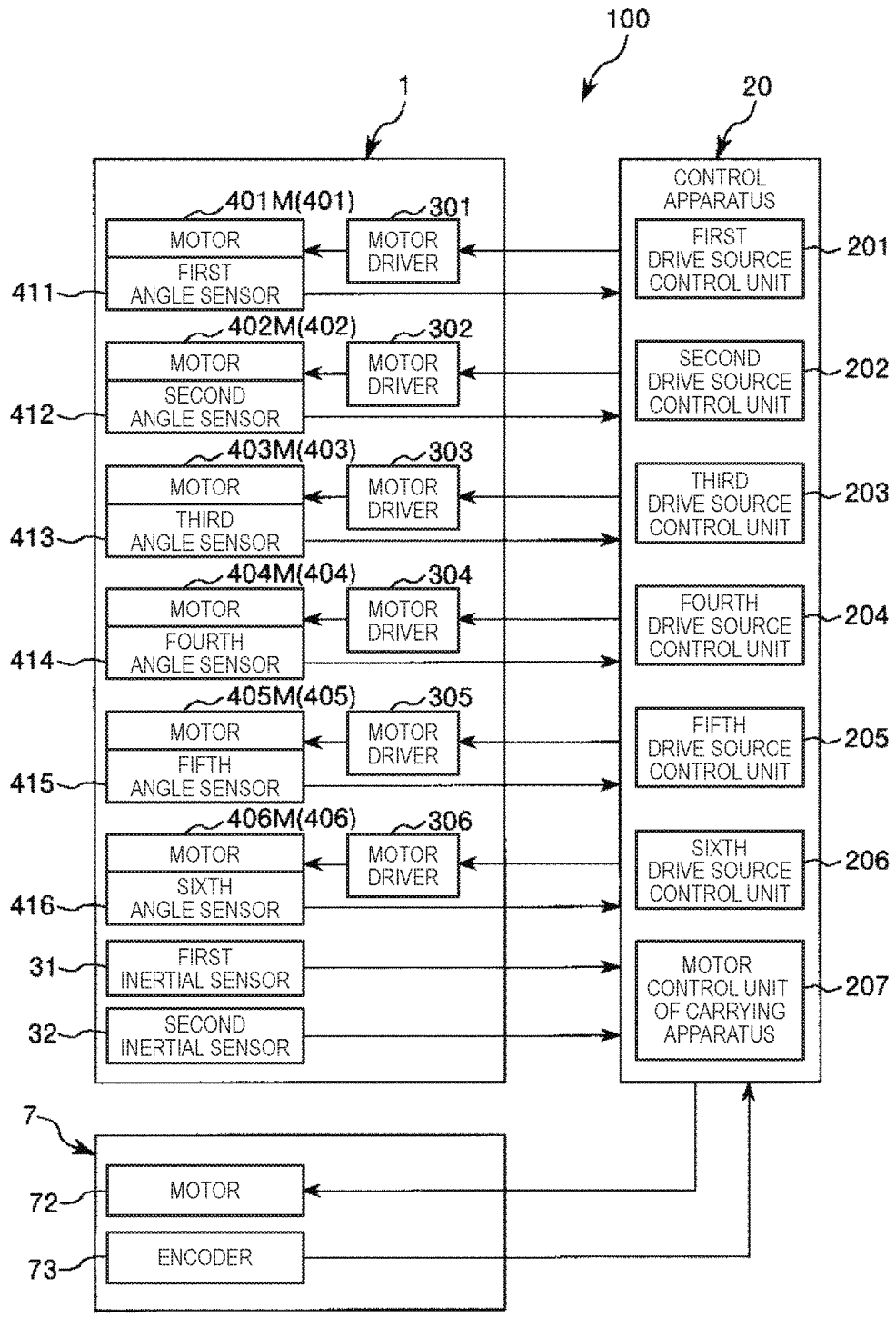
FIG. 3 is a block diagram of a main part of the embodiment of the robot system according to the invention.
Figure 4:
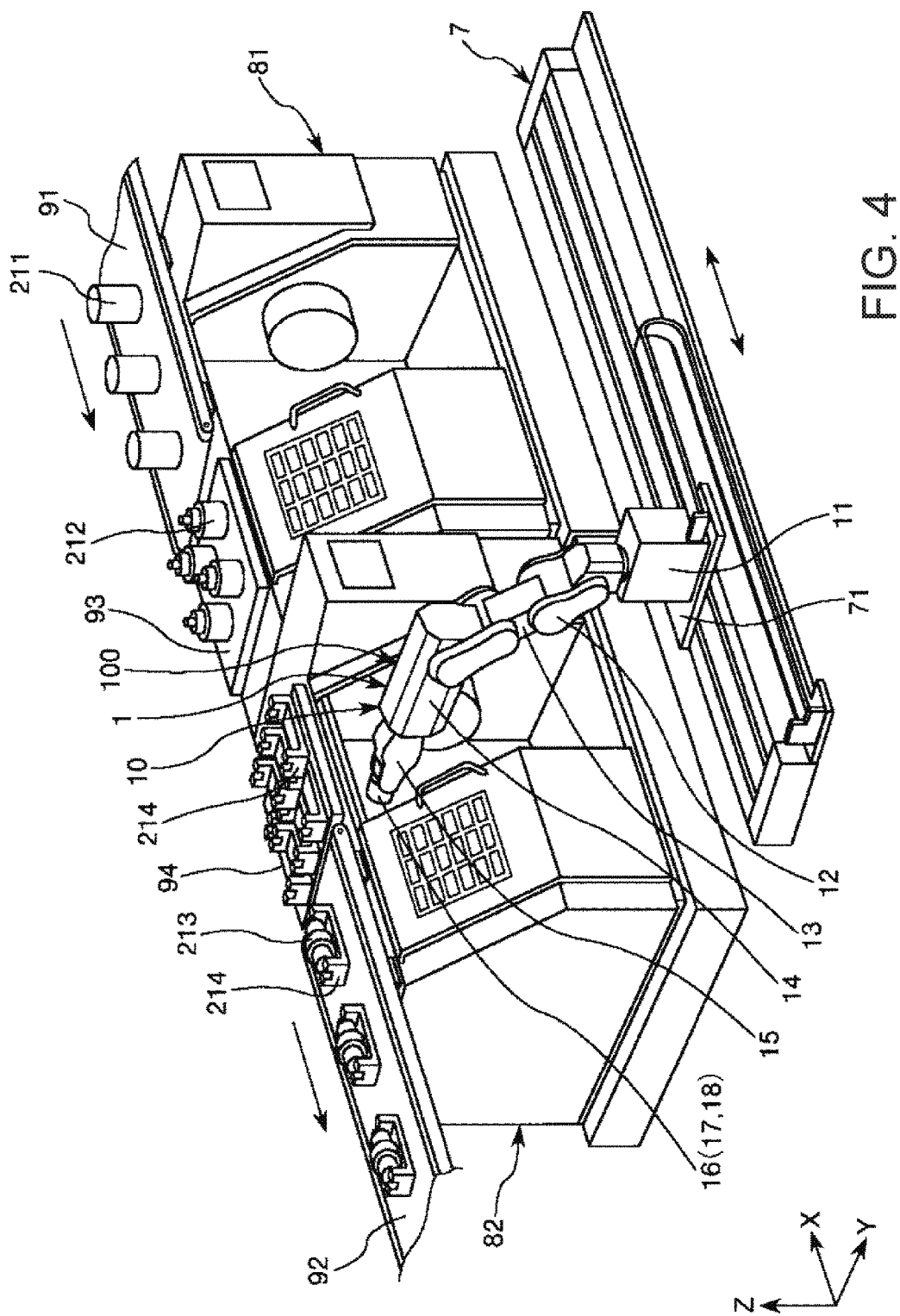
FIG. 4 is a perspective view showing the embodiment of the robot system according to the invention and an example of a work of the robot system.
Figure 5:
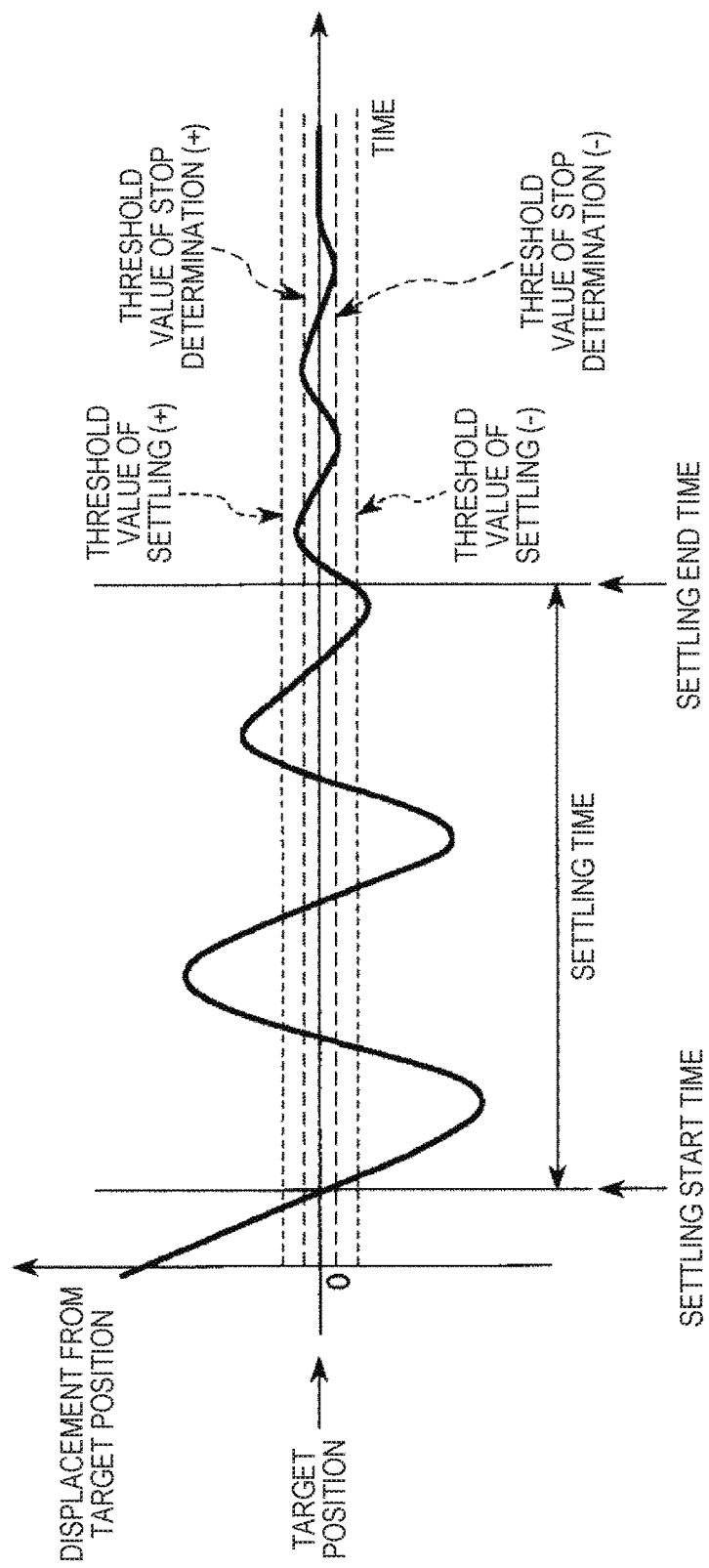
FIG. 5 is a diagram for explanation of a settling start time, a settling end time, a settling time, etc.
Figure 6:
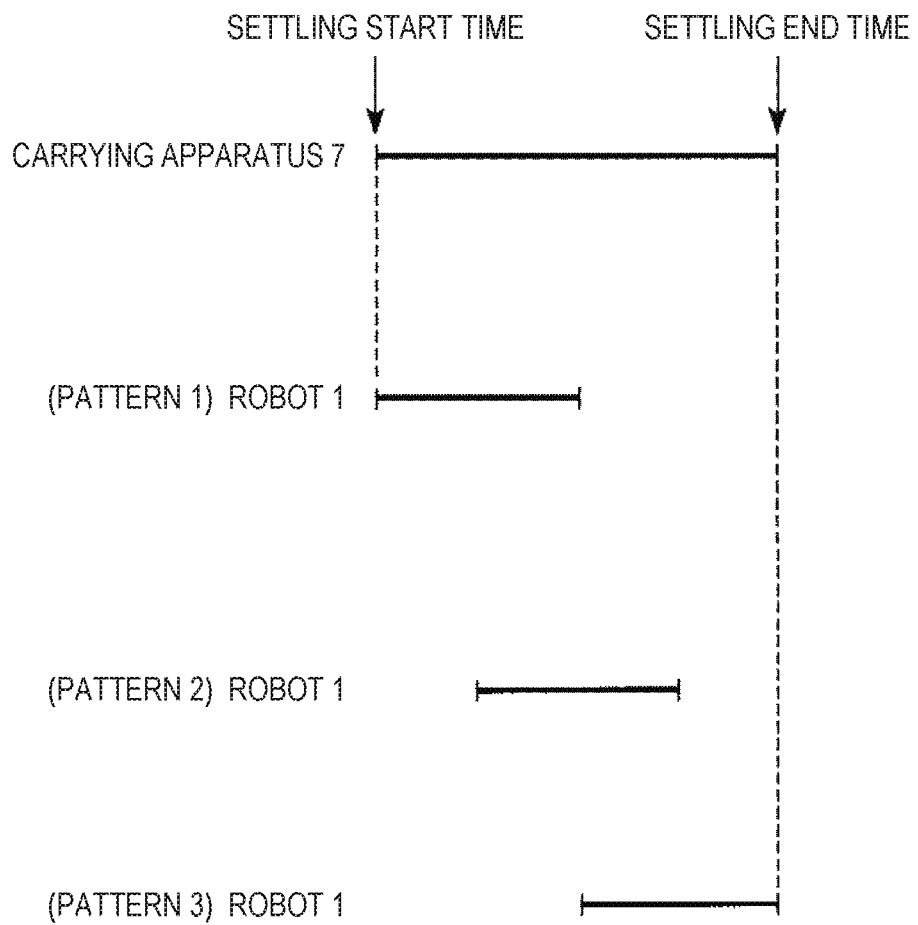
FIG. 6 is a diagram for explanation of a relationship among settling start times and settling end times of robots and a settling start time and a settling end time of a carrying apparatus.
Figure 7:
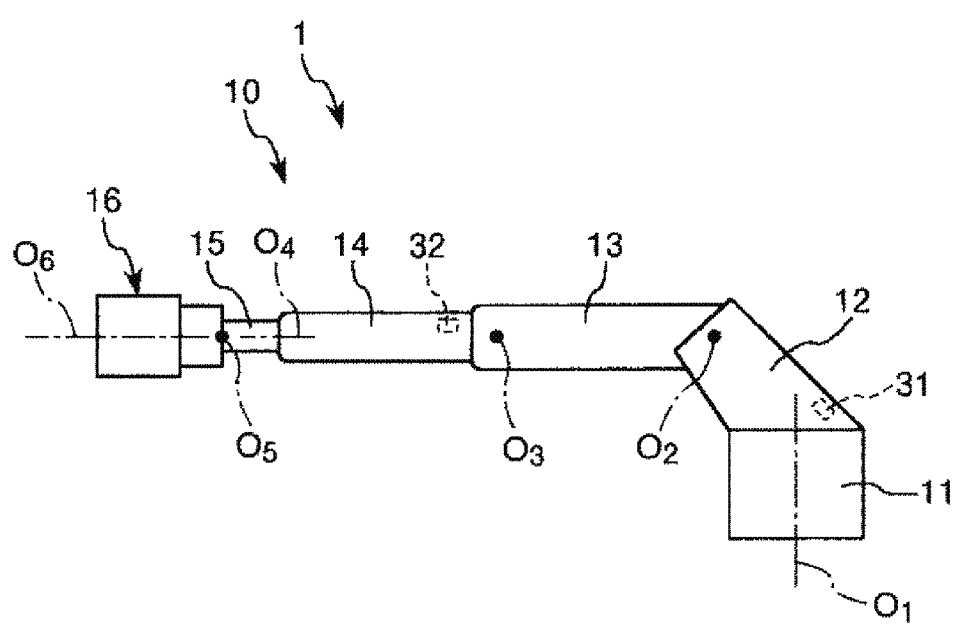
FIG. 7 is a diagram for explanation of an attitude of the robot.

FIG. 1 is a perspective view of a robot as seen from the front side in an embodiment of a robot system according to the invention. FIG. 2 is a schematic diagram of the robot shown in FIG. 1. FIG. 3 is a block diagram of a main part of the embodiment of the robot system according to the invention. FIG. 4 is a perspective view showing the embodiment of the robot system according to the invention and an example of a work of the robot system. FIG. 5 is a diagram for explanation of a settling start time, a settling end time, a settling time, etc. FIG. 6 is a diagram for explanation of a relationship among settling start times and settling end times of robots and a settling start time and a settling end time of a carrying apparatus. FIG. 7 is a diagram for explanation of an attitude of the robot.

Hereinafter, for convenience of explanation, the upside in FIGS. 1, 2, and 7 is referred to as "up" or "upper" and the downside is referred to as "low" or "lower". Further, the base side in FIGS. 1, 2, and 7 is referred to as "proximal end" or "upstream" and the opposite side is referred to as "distal end" or "downstream". Furthermore, upward and downward directions in FIGS. 1, 2, and 7 are referred to as "vertical directions".

Further, as shown in FIG. 4, three axes orthogonal to one another are referred to as "X-axis", "Y-axis", and "Z-axis". The XY plane containing the X-axis and the Y-axis are horizontal and the direction of the Z-axis is a vertical direction. The direction parallel to the X-axis is also referred to as "X-direction", the direction parallel to the Y-axis is also referred to as "Y-direction", and the direction parallel to the Z-axis is also referred to as "Z-direction". The directions of arrows of the respective axes of the X-axis, the Y-axis, and the Z-axis are referred to as positive sides and the opposite directions of the arrows are referred to as negative sides.

A robot system (industrial robot system) 100 shown in FIGS. 1 to 4 includes a robot (industrial robot) 1, a carrying apparatus 7 that can move (carry) the robot 1, and a control apparatus (control unit) 20 that controls operation (driving) of the robot 1 and the carrying apparatus 7. For example, the robot system 100 may be used in a manufacturing process of manufacturing precision apparatuses such as wristwatches or the like.

Part or all of the control apparatus 20 may be built in the robot 1 or provided separately from the robot 1. Further, the control apparatus 20 may be formed using e.g. a personal computer (PC) containing a CPU (Central Processing Unit) or the like. The control apparatus 20 includes a first drive source control unit 201 that controls operation (driving) of a first drive source 401, a second drive source control unit 202 that controls operation of a second drive source 402, a third drive source control unit 203 that controls operation of a third drive source 403, a fourth drive source control unit 204 that controls operation of a fourth drive source 404, a fifth drive source control unit 205 that controls operation of a fifth drive source 405, a sixth drive source control unit 206 that controls operation of a sixth drive source 406 of the robot 1, which will be described later, and a motor control unit 207 that controls operation (driving) of a motor 72 of the carrying apparatus 7, which will be described later, etc.

The robot 1 has a base (supporting unit) 11 and a robot arm 10. The robot arm 10 includes a first arm (first arm member) (arm part) 12, a second arm (second arm member) (arm part) 13, a third arm (third arm member) (arm part) 14, a fourth arm (fourth arm member) (arm part) 15, a fifth (fifth arm member) (arm part) arm 17, and a sixth arm (sixth arm member) (arm part) 18 (six arms), and the first drive source (first drive unit) 401, the second drive source (second drive unit) 402, the third drive source (third drive unit) 403, the fourth drive source (fourth drive unit) 404, the fifth drive source (fifth drive unit) 405, and the sixth drive source 406 (sixth drive unit) (six drive sources). The fifth arm 17 and the sixth arm 18 form a wrist 16 and e.g. an end effector (not shown) or the like may be detachably attached to the distal end of the sixth arm 18, i.e., the distal end of the wrist 16.

The robot 1 is a vertical articulated (six-axis) robot in which the base 11, the first arm 12, the second arm 13, the third arm 14, the fourth arm 15, the fifth arm 17, and the sixth arm 18 are sequentially coupled from the proximal end side toward the distal end side. As below, the first arm 12, the second arm 13, the third arm 14, the fourth arm 15, the fifth arm 17, the sixth arm 18, and the wrist 16 will be respectively also referred to as "arm". The first drive source 401, the second drive source 402, the third drive source 403, the fourth drive source 404, the fifth drive source 405, and the sixth drive source 406 will be respectively also referred to as "drive source (drive unit)".

As shown in FIGS. 2 and 7, the arms 12 to 15 and the wrist 16 are respectively supported to be independently displaceable with respect to the base 11. The respective lengths of the arms 12 to 15 and the wrist 16 are not particularly limited. In the illustrated configuration, the lengths of the arms 12 to 14 are set to be longer than the lengths of the other arm 15 and the wrist 16.

The base 11 and the first arm 12 are coupled via a joint 171. The first arm 12 is rotatable around the first rotation axis O1 in parallel to the vertical direction about the first rotation axis O1 with respect to the base 11. The first rotation axis O1 is aligned with a normal of an upper surface of a slider 71, which will be described later, as an installation surface of the base 11. Further, the first rotation axis O1 is a rotation axis on the most upstream side of the robot 1. The rotation about the first rotation axis O1 (the drive of the first arm 12) is performed by driving of the first drive source 401 having a motor (first motor) 401M and a reducer (not shown). The first drive source 401 is driven by the motor 401M and a cable (not shown), and the motor 401M is controlled by the control apparatus 20 via a motor driver 301 electrically connected thereto. Note that the reducer may be omitted.

The first arm 12 and the second arm 13 are coupled via a joint (connecting part) 172. The second arm 13 is rotatable around a second rotation axis O2 in parallel to the horizontal direction about the second rotation axis O2 with respect to the first arm 12. The second rotation axis O2 is orthogonal to the first rotation axis O1. The rotation about the second rotation axis O2 (the drive of the second arm 13) is performed by driving of the second drive source 402 having a motor (second motor) 402M and a reducer (not shown). The second drive source 402 is driven by the motor 402M and a cable (not shown), and the motor 402M is controlled by the control apparatus 20 via a motor driver 302 electrically connected thereto. Note that the reducer may be omitted. Or, the second rotation axis O2 may be parallel to an axis orthogonal to the first rotation axis O1.

The second arm 13 and the third arm 14 are coupled via a joint (connecting part) 173. The third arm 14 is rotatable around a third rotation axis O3 in parallel to the horizontal direction about the third rotation axis O3 with respect to the second arm 13. The third rotation axis O3 is parallel to the second rotation axis O2. The rotation about the third rotation axis O3 (the drive of the third arm 14) is performed by driving of the third drive source 403 having a motor (third motor) 403M and a reducer (not shown). The third drive source 403 is driven by the motor 403M and a cable (not shown), and the motor 403M is controlled by the control apparatus 20 via a motor driver 303 electrically connected thereto. Note that the reducer may be omitted.

The third arm 14 and the fourth arm 15 are coupled via a joint (connecting part) 174. The fourth arm 15 is rotatable around a fourth rotation axis O4 in parallel to the center axis direction of the third arm 14 about the fourth rotation axis O4 with respect to the third arm 14. The fourth rotation axis O4 is orthogonal to the third rotation axis O3. The rotation about the fourth rotation axis O4 (the drive of the fourth arm 15) is performed by driving of the fourth drive source 404 having a motor (fourth motor) 404M and a reducer (not shown). The fourth drive source 404 is driven by the motor 404M and a cable (not shown), and the motor 404M is controlled by the control apparatus 20 via a motor driver 304 electrically connected thereto. Note that the reducer may be omitted. Or, the fourth rotation axis O4 may be parallel to an axis orthogonal to the third rotation axis O3.

The fourth arm 15 and the fifth arm 17 of the wrist 16 are coupled via a joint (connecting part) 175. The fifth arm 17 is rotatable around a fifth rotation axis O5 about the fifth rotation axis O5 with respect to the fourth arm 15. The fifth rotation axis O5 is orthogonal to the fourth rotation axis O4. The rotation about the fifth rotation axis O5 (the drive of the fifth arm 17) is performed by driving of the fifth drive source 405 having a motor (fifth motor) 405M and a reducer (not shown). The fifth drive source 405 is driven by the motor 405M and a cable (not shown), and the motor 405M is controlled by the control apparatus 20 via a motor driver 305 electrically connected thereto. Note that the reducer may be omitted. Or, the fifth rotation axis O5 may be parallel to an axis orthogonal to the fourth rotation axis O4.

The fifth arm 17 and the sixth arm 18 of the wrist 16 are coupled via a joint (connecting part) 176. The sixth arm 18 is rotatable around a sixth rotation axis O6 about the sixth rotation axis O6 with respect to the fifth arm 17. The rotation axis O6 is orthogonal to the rotation axis O5. The rotation about the sixth rotation axis O6 (the drive of the sixth arm 18) is performed by driving of the sixth drive source 406 having a motor (sixth motor) 406M and a reducer (not shown). The sixth drive source 406 is driven by the motor 406M and a cable (not shown), and the motor 406M is controlled by the control apparatus 20 via a motor driver 306 electrically connected thereto. Note that the reducer may be omitted. Or, the sixth rotation axis O6 may be parallel to an axis orthogonal to the fifth rotation axis O5.

In the embodiment, a first inertial sensor 31 is provided in the first arm 12 (see FIG. 7). The angular velocity of the first arm 12 can be detected by the first inertial sensor 31. The position in which the first inertial sensor 31 is placed in the first arm 12 is not particularly limited. In the embodiment, the first inertial sensor 31 is placed in the proximal end part of the first arm 12. Note that, for example, the first inertial sensor 31 may be placed in the distal end part of the first arm 12. The vibration of the first arm 12 becomes the maximum in the distal end part, and thereby, vibrations of the robot 1 may be suppressed more reliably.

Further, a second inertial sensor 32 is placed in the third arm 14 (see FIG. 7). The angular velocity of the third arm 14 can be detected by the second inertial sensor 32. The position in which the second inertial sensor 32 is placed in the third arm 14 is not particularly limited. In the embodiment, the second inertial sensor 32 is provided in the proximal end part of the third arm 14. Note that, for example, the second inertial sensor 32 may be placed in the distal end part of the third arm 14. The vibration of the third arm 14 becomes the maximum in the distal end part, and thereby, vibrations of the robot 1 may be suppressed more reliably. Or, the second inertial sensor 32 may be set in e.g. the second arm 13, besides the third arm 14.

The first inertial sensor 31 and the second inertial sensor 32 are respectively not particularly limited. In the embodiment, e.g. angular velocity sensors (gyro sensors) or the like may be used.

Here, in the robot 1, vibrations of the arms 12, 13, and 14 are suppressed, and thereby, vibrations of the whole robot 1 are suppressed. Note that, to suppress the vibrations of the arms 12, 13, and 14, the inertial sensors are placed in not all of the arms 12, 13, and 14, but the first inertial sensor 31, the second inertial sensor 32 are placed only in the arms 12, 14 as described above and the operation of the drive sources 401, 402 is controlled based on the detection results of the first inertial sensor 31, the second inertial sensor 32. Thereby, in comparison to the case where the inertial sensors are placed in all of the arms 12, 13, and 14, the number of inertial sensors may be reduced, the cost may be reduced, and the circuit configuration may be simplified.

The number of inertial sensors is not limited to two, but may be one or three or more. The positions in which the inertial sensors are placed are not limited to the first arm 12 and the third arm 14, but may be the other arms.

In the drive sources 401 to 406, a first angle sensor 411, a second angle sensor 412, a third angle sensor 413, a fourth angle sensor 414, a fifth angle sensor 415, and a sixth angle sensor 416 are provided in the respective motors or reducers. The angle sensors are not particularly limited, but e.g. encoders including rotary encoders or the like may be used. By the angle sensors 411 to 416, the rotation (rotating) angles of the rotation axes (rotating axes) of the motors or the reduces of the drive sources 401 to 406 are detected, respectively. The motors of the drive sources 401 to 406 are not particularly limited, but e.g. servomotors such as AC servo motors or DC servo motors are preferably used. Further, the respective cables may be inserted through the robot 1.

As shown in FIG. 3, the robot 1 is electrically connected to the control apparatus 20. That is, the drive sources 401 to 406, the angle sensors 411 to 416, the inertial sensors 31, 32 are respectively electrically connected to the control apparatus 20.

Further, the control apparatus 20 may respectively independently operate the arms 12 to 15 and the wrist 16, in other words, may respectively independently control the drive sources 401 to 406 via the motor drivers 301 to 306. In this case, the control apparatus 20 performs detection using the angle sensors 411 to 416, the first inertial sensor 31, and the second inertial sensor 32 and respectively controls driving of the drive sources 401 to 406, e.g. angular velocities, rotation angles, or the like based on their detection results. The control program is stored in advance in a recording medium (memory unit) built in the control apparatus 20.

Damping control of the robot arm 10 of the robot 1 is performed based on the detection results of the first inertial sensor 31, the second inertial sensor 32, the first angle sensor 411, the second angle sensor 412, and the third angle sensor 413. Thereby, the vibrations of the robot 1 (robot arm 10) may be suppressed.

As shown in FIG. 1, in the embodiment, the base 11 is a part located at the lowermost side in the vertical direction of the robot 1 and to be fixed (placed) onto the slider 71 or the like. The fixing method is not particularly limited, but e.g. a fixing method using a plurality of bolts 111 is employed in the embodiment shown in FIG. 1.

The base 11 houses e.g. the motor 401M and the motor drivers 301 to 306.

The arms 12 to 15 each have a hollow arm main body 2, a drive mechanism 3, and a sealing unit 4. Hereinafter, for convenience of explanation, the arm main body 2, the drive mechanism 3, and the sealing unit 4 of the first arm 12 may be referred to as "arm main body 2a", "drive mechanism 3a", and "sealing unit 4a", respectively, the arm main body 2, the drive mechanism 3, and the sealing unit 4 of the second arm 13 may be referred to as "arm main body 2b", "drive mechanism 3b", and "sealing unit 4b", respectively, the arm main body 2, the drive mechanism 3, and the sealing unit 4 of the third arm 14 may be referred to as "arm main body 2c", "drive mechanism 3c", and "sealing unit 4c", respectively, and the arm main body 2, the drive mechanism 3, and the sealing unit 4 of the fourth arm 15 may be referred to as "arm main body 2d", "drive mechanism 3d", and "sealing unit 4d", respectively.

Further, the joints 171 to 176 each have a rotation support mechanism (not shown). The rotation support mechanisms include mechanisms that rotatably support one of the two arms coupled to each other with respect to the other and a mechanism that rotatably supports one of the base 11 and the first arm 12 coupled to each other with respect to the other. In the case where the fourth arm 15 and the fifth arm 17 of the wrist 16 coupled to each other are taken as an example, the rotation support mechanism may rotate the wrist 16 with respect to the fourth arm 15. The respective rotation support mechanisms respectively have reducers (not shown) that reduce rotation speeds of the corresponding motors at predetermined reduction ratios and transmit their drive power to the corresponding arms, a wrist main body 161 of the wrist 16, and a supporting ring 162.

The first arm 12 is coupled to the upper end part (distal end part) of the base 11 in an attitude inclined with respect to the horizontal direction. In the first arm 12, the drive mechanism 3a has the motor 402M and houses the motor within the arm main body 2a. The interior of the arm main body 2a is air-tightly sealed by the sealing unit 4a.

The second arm 13 is coupled to the distal end part of the first arm 12. In the second arm 13, the drive mechanism 3b has the motor 403M and houses the motor within the arm main body 2b. The interior of the arm main body 2b is air-tightly sealed by the sealing unit 4b.

The third arm 14 is coupled to the distal end part of the second arm 13. In the third arm 14, the drive mechanism 3c has the motor 404M and houses the motor within the arm main body 2c. The interior of the arm main body 2c is air-tightly sealed by the sealing unit 4c.

The fourth arm 15 is coupled to the distal end part of the third arm 14 in parallel to the center axis direction thereof. In the fourth arm 15, the drive mechanism 3d has the motors 405M, 406M and houses the motors within the arm main body 2d. The interior of the arm main body 2d is air-tightly sealed by the sealing unit 4d.

The wrist 16 is coupled to the distal end part (the opposite end part to the base 11) of the fourth arm 15. To the wrist 16, e.g. an end effector or the like is detachably attached to the distal end part (the opposite end part to the fourth arm 15) thereof.

The end effector includes, but not particularly limited to, e.g. a hand (not shown) or the like that grasps a precision apparatus such as a wristwatch, a part, or the like. The driving of the hand (end effector) is controlled by a control apparatus 20. The hand includes, but not particularly limited to, e.g. a hand having a plurality of finger portions (fingers). The robot 1 controls the motions of the arms 12 to 15, the wrist 16, etc. while grasping a precision apparatus, a part, or the like with the hand, and thereby, may perform respective works of carrying the precision apparatus, the part, or the like.

The wrist 16 has the wrist main body 161 having a cylindrical shape as the sixth arm 18 and the supporting ring 162 formed separately from the wrist main body 161, provided in the proximal end part of the wrist main body 161, and having a ring shape as the fifth arm 17.

A distal end surface 163 of the wrist main body 161 is a flat surface and serves as an attachment surface to which the hand is attached. Further, the wrist main body 161 is coupled to the drive mechanism 3d of the fourth arm 15 via the joint 176, and rotates about the rotation axis O6 by driving the motor 406M of the drive mechanism 3d.

The supporting ring 162 is coupled to the drive mechanism 3d of the fourth arm 15 via the joint 175, and rotates about the rotation axis O5 integrally with the wrist main body 161 by driving of the motor 405M of the drive mechanism 3d.

Next, the carrying apparatus 7 will be explained.

As shown in FIG. 4, in the embodiment, the carrying apparatus 7 is an apparatus called a carrying axis that can linearly move the robot 1. The carrying apparatus 7 is adapted to move the robot 1 in both directions toward the positive side and the negative side in the X-directions in the illustrated configuration. The carrying apparatus 7 has ball screws (not shown), the motor 72 that rotates the ball screws (see FIG. 3), the encoder 73 (see FIG. 3) and the slider 71 that moves in the X-directions by the rotation of the ball screws. The base 11 of the robot 1 is fixed (placed) onto the slider 71.

In the carrying apparatus 7, when the ball screws rotate in a predetermined direction by driving of the motor 72, the slider 71 moves toward the negative side in the X-directions and, when the ball screws rotate reversely, the slider 71 moves toward the positive side in the X-directions.

The encoder 73 is not particularly limited, but e.g. a rotary encoder, linear encoder, or the like provided in the motor 72 or the like may be used. The position of the slider 71 (robot 1) may be obtained based on the detection result of the encoder 73.

Further, the motor 72 is not particularly limited, but e.g. a servo motor such as an AC servo motor or a DC servo motor is preferably used.

As shown in FIG. 3, the carrying apparatus 7 is electrically connected to the control apparatus 20. That is, the motor 72 and the encoder 73 are respectively electrically connected to the control apparatus 20.

Next, an example of a work of the robot system 100 will be explained.

First, the respective apparatuses etc. used for the work of the robot system 100 are explained.

As shown in FIG. 4, the carrying apparatus 7 is installed so that the movement directions of the robot 1 may be the X-directions.

Further, a first processing machine 81 and a second processing machine 82 are installed along the X-directions. The first processing machine 81 and the second processing machine 82 are sequentially placed toward the negative side in the X-directions. In the illustrated configuration, although the first processing machine 81 and the second processing machine 82 are respectively NC lathes, this is just an example.

A belt conveyor 91 is placed above the first processing machine 81 in FIG. 4 and a belt conveyor 92 is placed above the second processing machine 82 in FIG. 4. The belt conveyor 91 is adapted to carry predetermined members or the like toward the negative side in the X-directions.

Further, a table 93 on which the predetermined members or the like are mounted is placed above the first processing machine 81 in FIG. 4 on the negative side in the X-directions of the belt conveyor 91.

Furthermore, a table 94 on which the predetermined members or the like are mounted is placed above the second processing machine 82 in FIG. 4 on the positive side in the X-directions of the belt conveyor 92.

In the work, first, unprocessed members 211 are conveyed by the belt conveyor 91. Further, the carrying apparatus 7 moves the robot 1 to a position in which the robot performs the work.

The robot 1 grasps the member 211 conveyed by the belt conveyor 91 and sets the member in the first processing machine 81. Then, the first processing machine 81 processes the member 211.

Then, the robot 1 grasps a member 212 set in the first processing machine 81 and mounts the member on the table 93.

Then, the robot 1 grasps the member 212 mounted on the table 93 and sets the member in the second processing machine 82. Then, the second processing machine 82 processes the member 212.

Then, the robot 1 grasps a member 213 set in the second processing machine 82 and attaches the member to a member 214 mounted on the table 94.

Then, the robot 1 mounts the members 213 and 214 on the belt conveyor 92. Then, the belt conveyor 92 conveys the members 213 and 214.

In the robot system 100, a relationship between a settling (static determinacy) start time (a time of settling start) and a settling end time (a time of settling end) of the robot 1 and a settling start time and a settling end time of the carrying apparatus 7 are defined.

First, a settling time, the settling start time, and the settling end time are explained with reference to FIG. 5.

As shown in FIG. 5, the settling start time for the robot 1 is a time, in the case where the distal end of the robot arm 10 (part to be measured) is moved to a target position, when the displacement (amount of displacement) of the distal end of the robot arm 10 from the target position first becomes zero (when the distal end first reaches the target position).

Further, as shown in FIG. 5, the settling end time for the robot 1 is a time, in the case where the distal end of the robot arm 10 is moved to a target position, when the displacement of the distal end of the robot arm 10 from the target position falls within a threshold value of settling (e.g. ±0.05 mm).

Furthermore, as shown in FIG. 5, the settling time for the robot 1 is a time, in the case where the distal end of the robot arm 10 is moved to a target position, from when the displacement of the distal end of the robot arm 10 from the target position first becomes zero to when the displacement falls within a threshold value of settling.

The settling start time, the settling end time, and the settling time, for the carrying apparatus 7 are the same as those of the robot 1 except that the times are respectively considered in the case where a predetermined part (part to be measured) of the slider 71 moving the robot 1 with the robot 1 mounted thereon is moved to a target position.

The settling start time and the settling end time for the robot 1 may be obtained based on the detection results of the angle sensors 411 to 416, and the settling start time and the settling end time for the carrying apparatus 7 may be obtained based on the detection result of the encoder 73.

Note that the settling start times and the settling end times may be obtained using other sensors. The other sensors include e.g. inertial sensors.

As below, the case where the settling time of the robot 1 is shorter than the settling time of the carrying apparatus 7 will be explained as an example. Note that, in the case where the settling time of the carrying apparatus 7 is shorter than the settling time of the robot 1, the robot 1 and the carrying apparatus 7 may be exchanged in the following explanation, and their explanation will be omitted.

In the robot system 100, as shown by patterns 1 to 3 in FIG. 6, the settling start time of the robot 1 (having the shorter settling time) is set to be later than the settling start time of the carrying apparatus 7 (having the longer settling time) or the same as the settling start time of the carrying apparatus 7.

Further, as shown by the patterns 1 to 3 in FIG. 6, the settling end time of the robot 1 is set to be earlier than the settling end time of the carrying apparatus 7 or the same as the settling end time of the carrying apparatus 7.

Thereby, the period between the settling start time and the settling end time of the robot 1 and the period between the settling start time and the settling end time of the carrying apparatus 7 overlap. More properly, the period between the settling start time and the settling end time of the carrying apparatus 7 includes the period between the settling start time and the settling end time of the robot 1. Thereby, the entire settling time of the robot 1 and the carrying apparatus 7 may be shortened.

In the robot system, the damping control of the robot 1 is performed, and thereby, the vibrations of the robot 1 may be suppressed. Further, by the damping control of the robot 1, vibrations of the carrying apparatus 7 (slider 71 etc.) may be suppressed.

The vibrations of the robot 1 are suppressed and the settling time of the robot 1 may be shortened, and the vibrations of the carrying apparatus 7 are suppressed and the settling time of the carrying apparatus 7 may be shortened. Thereby, the entire settling time of the robot 1 and the carrying apparatus 7 may be further shortened.

It is sufficient that the settling end time of the robot 1 is earlier than the settling end time of the carrying apparatus 7 or the same as the settling end time of the carrying apparatus 7, but, as shown by the pattern 3 in FIG. 6, preferably the same as the settling end time of the carrying apparatus 7. The settling end time of the robot 1 and the settling end time of the carrying apparatus 7 are set to be the same and the damping control of the robot 1 is performed at least until the settling end time of the robot 1, and thereby, the entire settling time of the robot 1 and the carrying apparatus 7 may be further shortened.

To set the settling end time of the robot 1 and the settling end time of the carrying apparatus 7 to be the same, for example, the respective settling times of the robot 1 and the carrying apparatus 7 are experimentally obtained in advance, and the settling start time of the robot 1 may be set to be later than the settling start time of the carrying apparatus 7 by a difference between the settling time of the carrying apparatus 7 and the settling time of the robot 1.

Note that, in the invention, in any of the case where the settling time of the robot 1 is shorter than the settling time of the carrying apparatus 7, the case where the settling time of the carrying apparatus 7 is shorter than the settling time of the robot 1, and the case where the settling time of the robot 1 and the settling time of the carrying apparatus 7 are the same, it is only necessary that the period between the settling start time and the settling end time of the robot 1 overlaps with at least a part of the period between the settling start time and the settling end time of the carrying apparatus 7. When the settling time of the robot 1 and the settling time of the carrying apparatus 7 are the same, it is preferable that the settling start time of the robot 1 is the same as the settling start time of the carrying apparatus 7 and the settling end time of the robot 1 is the same as the settling end time of the carrying apparatus 7.

Further, it is preferable to end the damping control of the robot 1 after settling of one having the later settling end time of the robot 1 and the carrying apparatus 7 (when the times are the same, the robot 1 or the carrying apparatus 7) ends, that is, after the settling of the carrying apparatus 7 ends. Thereby, the entire settling time of the robot 1 and the carrying apparatus 7 may be further shortened.

Furthermore, the damping control may be ended when the vibrations of the robot 1 and the vibrations of the carrying apparatus 7 respectively fall within predetermined ranges. Thereby, the vibrations of the robot 1 and the carrying apparatus 7 may be suppressed and the entire settling time of the robot 1 and the carrying apparatus 7 may be further shortened. Note that the predetermined ranges of the range with respect to the vibrations of the robot 1 and the range with respect to the vibrations of the carrying apparatus 7 may be the same or different.

Specifically, in the explanation by taking the robot 1 as an example, first, as shown in FIG. 5, in the case where the distal end of the robot arm 10 is moved to a target position, when the displacement of the distal end of the robot arm 10 from the target position falls within a threshold value of stop determination, a determination that the robot 1 has stopped is made. Then, if the determination that the robot 1 has stopped is made, the damping control of the robot 1 is ended. Note that the absolute value of the threshold value of stop determination is smaller than the absolute value of the threshold value of settling in the illustrated configuration, however, not limited to that. The absolute value may be larger than the absolute value of the threshold value of settling or the same as the absolute value of the threshold value of settling.

The attitude of the robot 1 (robot arm 10) when the robot 1 is moved by the carrying apparatus 7 is not particularly limited, but may be preferably e.g. an attitude (state) in which the second arms 13 to the wrist 16 are linearly stretched in the horizontal direction (the direction orthogonal to the first rotation axis O1) to the left in FIG. 7. Thereby, the vibrations of the robot 1 and the vibrations of the carrying apparatus 7 during movement of the robot 1 may be reduced.

As described above, according to the robot system 100 (robot 1), the entire settling time of the robot 1 and the carrying apparatus 7 may be shortened. Thereby, the time from the settling start time of the present action to the next action may be shortened.

Further, even when the attitude of the robot arm 10 during movement of the robot 1 is set to an attitude in which vibrations of the robot 1 in movement are larger like e.g. an attitude in which the robot arm 10 is stretched upward in FIG. 7 (not shown), according to the robot system 100, the entire settling time of the robot 1 and the carrying apparatus 7 may be shortened and the greater effect may be obtained.

As above, the robot and the robot system according to the invention are explained based on the illustrated embodiments, however, the invention is not limited to those. The configurations of the respective parts may be replaced by arbitrary configurations having the same functions. Further, other arbitrary configurations may be added.

In the invention, the respective motors include e.g. stepping motors, not limited to the above described servo motors.

In the above described embodiment, the encoders are respectively used as the respective angle sensors of the robot, however, the invention is not limited to those. For example, various other sensors that detect the rotation angles of the rotors of the motors and the rotation axes (rotating axes) of the reducers including resolvers and potentiometers may be used and various sensors that detect the rotation speeds of the rotors of the motors and the rotation axes of the reducers including tacho generators may be used. When the stepping motors are used as the motors, for example, the rotation angles and the rotation speeds of the rotors of the motors may be detected by measurement of the numbers of drive pulses input to the stepping motors. The same applies to the carrying apparatus.

In the above described embodiment, the angular velocity sensors (gyro sensors) are used as the respective inertial sensors, however, the invention is not limited to those. For example, various acceleration sensors that detect accelerations of the arms or the like may be used. When the acceleration sensors are used, the angular velocities are calculated using the detection values of the acceleration sensors.

The encoder, the respective angle sensors, and the respective inertial sensors include, but not particularly limited to, e.g., optical, magnetic, electromagnetic, electrical sensors.

In the above described embodiment, the number of rotation axes of the robot is six, however, the invention is not limited to that. The number of rotation axes of the robot may be e.g. two, three, four, five, or seven or more.

That is, in the above described embodiment, the wrist has the two arms and the number of arms is six, however, the invention is not limited to that. The number of arms of the robot may be two, three, four, five, or seven or more.

Further, in the above described embodiment, the robot is the single-arm robot including one robot arm having a plurality of rotatable arms, however, the invention is not limited to that. For example, the robot may be a robot including a plurality of robot arms such as a dual-arm robot including two robot arms, for example.

Furthermore, in the above described embodiment, the hand is taken as an example as the end effector, however, the invention is not limited to that. In addition, as the end effector, for example, a drill, a welding machine, a laser irradiation machine, etc. may be employed.

In the above described embodiment, the surface to which the robot (base) is fixed is a plane (surface) in parallel to the horizontal plane, however, the invention is not limited to that. For example, a plane (surface) inclined with respect to the horizontal plane and the vertical plane may be employed or a plane (surface) in parallel to the vertical plane may be employed. That is, the first rotation axis may be inclined with respect to the vertical direction and the horizontal direction or parallel to the horizontal direction.

In the invention, the robot may be a robot of another type. A specific example includes e.g. a legged walking (running) robot having leg parts and a horizontal articulated robot such as a scalar robot.

Further, in the above described embodiment, the carrying apparatus linearly moves the robot, however, the invention is not limited to that. The carrying apparatus may move the robot in arbitrary directions in e.g. a curved line, a polygonal line, or the like.

In the invention, an inertial sensor may be provided in the carrying apparatus. Further, damping control of the carrying apparatus may be performed based on the detection result of the inertial sensor.

The entire disclosure of Japanese Patent Application No. 2015-233338, filed Nov. 30, 2015 is expressly incorporated by reference herein.

What is claimed is:

1. A robot system comprising:
   a robot arm;
   a carrier that supports and moves the robot arm; and
   a controller configured to control movement of the robot arm on the carrier, wherein
   the controller is configured to determine a settling start time for the robot arm equal to a time when a displacement of a distal end of the robot arm from a target position first becomes zero and a settling end time equal to a time when the displacement of the distal end of the robot arm from the target position falls within a first threshold settling value,
   the controller is configured to determine a settling start time for the carrier equal to a time when a displacement of the carrier from a target position first becomes zero and a settling end time equal to a time when the displacement of the carrier from the target position falls within a second threshold settling value, and
   a period between the settling start time and the settling end time of the robot arm overlaps with at least a part of a period between the settling start time and the settling end time of the carrier.

2. The robot system according to claim 1, wherein the settling start time of the one of the robot arm and the carrier having a shorter settling time is later than the settling start time of the other of the robot arm and the carrier having a longer settling time or the same as the settling start time of the other of the robot arm and the carrier having the longer settling time.

3. The robot system according to claim 1, wherein the settling end time of the one of the robot arm and the carrier having a shorter settling time is earlier than the settling end time of the other of the robot arm and the carrier having a longer settling time or the same as the settling end time of the other of the robot arm and the carrier having the longer settling time.

4. The robot system according to claim 1, further comprising:
   an inertial sensor located in the robot arm; and
   a controller configured to control the robot arm,
   wherein the controller is configured to perform damping control on the robot arm based on a detection result of the inertial sensor.

5. The robot system according to claim 4, wherein the inertial sensor is an angular velocity sensor.

6. The robot system according to claim 4, wherein the controller is configured to end damping control after settling ends for the one of the robot arm and the carrier having the later settling end.

7. The robot system according to claim 4, wherein the controller is configured to end damping control when vibrations of the robot arm and vibrations of the carrier respectively fall within predetermined ranges.

8. The robot system according to claim 1, wherein the robot arm includes:
   a first arm rotatable about a first rotation axis, and
   a second arm provided on the first arm to be rotatable about a second rotation axis in an axis direction different from an axis direction of the first rotation axis.

9. The robot system according to claim 1, wherein a settling time of the robot arm is shorter than a settling time of the carrying apparatus carrier.

10. The robot system according to claim 1, wherein the period between the settling start time and the settling end time of the robot arm is contained within a period between the settling start time and the settling end time of the carrier.

* * * * *